United States Patent
Marupaduga et al.

(10) Patent No.: US 10,314,055 B1
(45) Date of Patent: Jun. 4, 2019

(54) COMPONENT CARRIER ASSIGNMENT USING SECTOR POWER RATIO

(71) Applicant: Sprint Communications Company L.P., Overland Park, KS (US)

(72) Inventors: Sreekar Marupaduga, Overland Park, KS (US); Andrew M. Wurtenberger, Olathe, KS (US); Rajveen Narendran, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/714,387

(22) Filed: Sep. 25, 2017

(51) Int. Cl.
| | |
|---|---|
| *H04W 28/16* | (2009.01) |
| *H04W 72/08* | (2009.01) |
| *H04B 7/024* | (2017.01) |
| *H04L 5/00* | (2006.01) |
| *H04W 28/08* | (2009.01) |
| *H04W 36/30* | (2009.01) |
| *H04W 24/10* | (2009.01) |
| *H04W 72/04* | (2009.01) |
| *H04W 76/27* | (2018.01) |

(52) U.S. Cl.
CPC .......... *H04W 72/085* (2013.01); *H04B 7/024* (2013.01); *H04L 5/0035* (2013.01); *H04W 28/08* (2013.01); *H04W 28/16* (2013.01); *H04W 36/30* (2013.01); *H04W 24/10* (2013.01); *H04W 72/0453* (2013.01); *H04W 76/27* (2018.02)

(58) Field of Classification Search
CPC ... H04W 72/085; H04W 36/30; H04W 28/08; H04W 28/16; H04W 76/27; H04W 72/0453; H04W 24/10; H04B 7/024; H04L 5/0035

See application file for complete search history.

(56) References Cited

U.S. PATENT DOCUMENTS

| | | | |
|---|---|---|---|
| 2015/0222025 A1* | 8/2015 | Song | H01Q 21/24 343/798 |
| 2017/0006587 A1* | 1/2017 | Kim | H04W 52/0216 |
| 2017/0238316 A1* | 8/2017 | Li | H04W 72/0453 370/329 |

OTHER PUBLICATIONS

Wannstrom, Jeanette, Carrier Aggregation Explained, Jun. 2013, 6 pages. http://www.3gpp.org/technologies/keywords-acronyms/101-carrier-aggregation-explained.
LTE and LTE-Advanced with Carver Aggregation, BLUEST.se, Dec. 13, 2016, 5 pages. https://bluetest.se/technology/articles/lte-and-lte-advanced-carrier-aggregation.
Antenna sector power ratio (total power)—Electrical Engineering Stack Exchange, 2016, 3 pages. https://electronics.stackexchange.com/questions/257575/antenna-sector-power-ratio-total-power.

(Continued)

*Primary Examiner* — Chuong A Ngo

(57) ABSTRACT

System, methods, and computer-readable media herein dynamically assign bands to primary and secondary component carriers for inter-carrier aggregation capable devices. In embodiments, an inter-carrier aggregation capable device is identified as being within a coverage area of a cell site component that is controlled by a base station. When the device is within a predefined distance of the cell site component, throughput of the device is analyzed. When the throughput indicates that the device is impacted by noise and/or interference at the cell site, the base station assigns a band to a primary component carrier based on the sector power ratio (SPR) of a corresponding antenna.

19 Claims, 8 Drawing Sheets

(56) References Cited

OTHER PUBLICATIONS

Antenna pattern beam quint and sector power ratio, RF Wireless World, 6 pages. http://www.rfwireless-world.com/Terminology/antenna-pattern-beam-squint-vs-sector-power-ratio.html.
Husnu S. Narman; Mohammed Atiquzzaman, "Carder Components Assignment Method for LTE and LTE—A Systems Based on User Profile and Application," 2014 IEEE Globecom Workshops (GC Wkshops), IEEE Conferemce Publications, 2014, pp. 1020-1025.

* cited by examiner

US 10,314,055 B1

COMPONENT CARRIER ASSIGNMENT USING SECTOR POWER RATIO

SUMMARY

A high-level overview of various aspects of the invention is provided here as an overview of the disclosure and to introduce a selection of concepts further described below in the detailed description. This summary is not intended to identify key features or essential features of the claimed subject matter, nor is it intended to be used as an aid in isolation to determine the scope of the claimed subject matter.

In brief and at a high level, this disclosure describes, among other things, systems, methods, and computer-readable media that employ sector power ratio (SPR) information to dynamically combat the negative impacts of noise and interference at a cell site.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
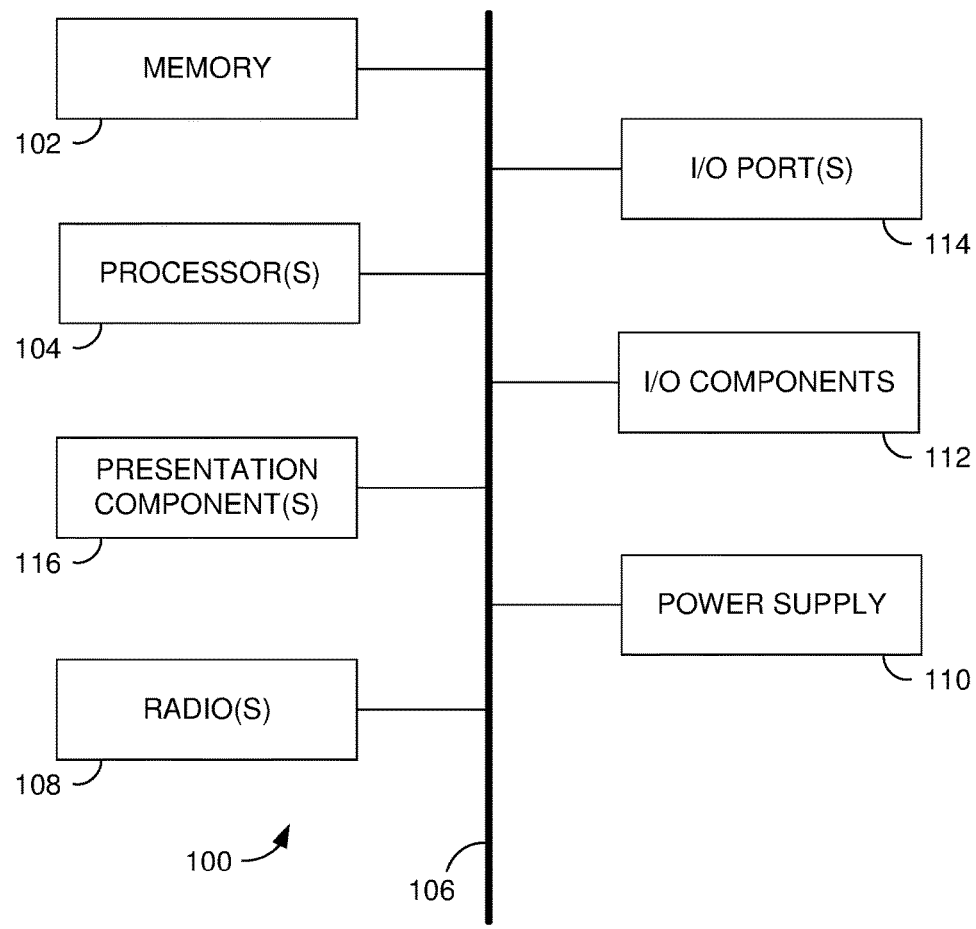
FIG. 1 depicts a schematic for an exemplary device, in accordance with an embodiment of the present invention.

The subject matter of select embodiments of the present invention is described with specificity herein to meet statutory requirements. The Detailed Description is not intended to define what is regarded as the invention, which is the purpose of the claims. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

AWS Advanced Wireless Services
BRS Broadband Radio Service
BTS Base Transceiver Station
CDMA Code Division Multiple Access
EBS Educational Broadband Services
eNodeB Evolved Node B
EVDO Evolution-Data Optimized
GPS Global Positioning System
GSM Global System for Mobile Communications
HRPD High Rate Packet Data
eHRPD Enhanced High Rate Packet Data
LTE Long Term Evolution
LTE-A Long Term Evolution Advanced
PCS Broadband Personal Communications Service
RNC Radio Network Controller
SyncE Synchronous Ethernet
TDM Time-Division Multiplexing
VOIP Voice Over Internet Protocol
WAN Wide Area Network
WCS Wireless Communications Service
WiMAX Worldwide Interoperability for Microwave Access Further, various technical terms are used throughout this description. A definition of such terms can be found in, for example, Newton's Telecom Dictionary by H. Newton, 27th Edition (2013). These definitions are intended to provide a clearer understanding of the ideas disclosed herein but are not intended to limit the scope of the present invention. The definitions and terms should be interpreted broadly and liberally to the extent allowed by the meaning of the words offered in the above-cited reference.

Embodiments of the technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media includes volatile and/or nonvolatile media, removable and non-removable media, and contemplate media readable by a database, a switch, and various other network devices. Network switches, routers, and related components are conventional in nature, as are means of communicating with the same. By way of example and not limitation, computer-readable media comprise computer storage media and/or communications media. Computer storage media, or machine-readable media, include media implemented in any method or technology for storing information. Examples of stored information include computer-useable instructions, data structures, program modules, and other data representations. Computer storage media include RAM, ROM, EEPROM, flash memory or other memory technology, CD-ROM, digital versatile discs (DVDs), holographic media or other optical disc storage, magnetic cassettes, magnetic tape, magnetic disc storage, and/or other magnetic storage devices. These memory components can store data momentarily, temporarily, or permanently. Computer storage media does not encompass a transitory signal, in embodiments of the present invention.

Communications media typically store computer-useable instructions, including data structures and program modules, in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

At a high level, systems, methods, and computer-readable media of the present invention employ sector power ratio (SPR) information, which describes the radio frequency power that is radiated outside of an antenna array's sector relative to the radio frequency power that is radiated and retained within the antenna array's sector, to dynamically combat noise and interference at a cell site. A base station uses SPR values of cell site antennas to select and assign specific bands to primary and second component carriers of user equipment in a telecommunications environment. The negative impacts caused by high-powered undesired RF radiation at a cell site may be reduced or mitigated by assigning a carrier band of low-SPR antennas to the primary component carrier of user equipment. In particular, a band that corresponds to a low-SPR antenna is assigned to the primary component carrier of an inter-carrier aggregation capable device that is geographically located at or near radio frequency "spillover" areas (i.e., radiation outside of an antenna's desired sector at a cell site) and which is experiencing lower throughput.

In a first aspect of the present invention, a method is provided. The method comprises determining that an inter-carrier aggregation capable device is within a predefined distance of a cell site. The method further comprises monitoring throughput of the inter-carrier aggregation capable device that is within the defined distance of the cell site. In embodiments, the method determines that the throughput of the inter-carrier aggregation capable device is at or below a threshold. The method continues by, subsequent to determining that the throughput of the inter-carrier aggregation capable device is at or below the threshold, assigning a first band to a primary component carrier associated with the inter-carrier aggregation capable device based on a sector power ratio (SPR) of the first band.

In a second aspect of the present invention, computer-readable media is provided, the computer-readable media having computer-executable instructions embodied thereon that, when executed, perform a method. In accordance with the media, a quantity of inter-carrier aggregation capable devices that are within a coverage area of a cell site is determined. At least one of the inter-carrier aggregation capable devices that is determined to be within the coverage area is within a specified distance of the cell site. In embodiments, throughput of the at least one inter-carrier aggregation capable device that is within the specified distance of the cell site is analyzed. The throughput of the at least one inter-carrier aggregation capable device is determined to be at or below a threshold. Subsequent to determining the throughput of the inter-carrier aggregation capable device is at or below the threshold, a first band is assigned to a primary component carrier associated with the at least one inter-carrier aggregation capable device based on an SPR of the first band relative to an SPR of other available bands at the cell site.

In a third aspect of the present invention, a system is provided. The system comprises a base station associated with a cell site having multiple antennas. The cell site is capable of RF transmissions in at least a first carrier band and second carrier band. The base station includes a processor that monitors the cell site to identify when an inter-carrier aggregation capable device enters a coverage area of the cell site. Each time an inter-carrier aggregation capable device enters the coverage area of the cell site, the processor determines whether the inter-carrier aggregation capable device is within a predefined distance of the cell site. When the inter-carrier aggregation capable device is within a predefined distance of the cell site, the processor monitors throughput of the inter-carrier aggregation capable device. subsequent to determining that the throughput is at or below a threshold, the processor assigns the first carrier band, based on SPR of the band, to a primary component carrier associated with the inter-carrier aggregation capable device, wherein the SPR of the first carrier band is less than an SPR of the second carrier band.

Beginning with FIG. 1, a block diagram of an exemplary device 100 is illustrated, for implementation of the present invention. The device 100 comprises memory 102 and a processor 104 communicatively coupled by a bus 106. In some embodiments, the device 100 further comprises one or more of a radio 108, a power supply 110, an input output (I/O) component 112, an I/O port 114, and/or a presentation component 116. Although the components of the device 100 are shown as blocks with solid outlines for the sake of clarity, in actuality there may not be a clear delineation between components. In additional, while the connections between the bus 106 and components of the device 100 are shown as direct, solid, straight lines, in actuality the connections for communication may be hardwired and/or wireless connections, and other components not pictured in FIG. 1 for brevity may be interposed between the bus 106 and the components of the device 100. As such, the bus 106 may directly or indirectly couple the components of the device 100 to one another. Moreover, FIG. 1 presents the components of the device 100 as singular and individual components; however, the device 100 may include any number of each of the components and FIG. 1 should not be construed as limiting the number, the organization, and/or the arrangement of components of the device 100.

Memory 102 includes computer storage media in the form of volatile and/or nonvolatile memory. Memory 102 may be removable, non-removable, or a combination thereof. Exemplary memory includes solid-state memory, hard drives, and/or optical-disc drives. The processor reads data from the memory and other sources in order to perform computing and processing tasks. Bus 106 represents one or more busses, such as an address bus, data bus, or a combination thereof. The radio 108 facilitates communication among wireless networks. Illustrative wireless technologies include CDMA, GPRS, TDMA, GSM, and the like. Additionally or alternatively, the radio 108 may facilitate wireless technologies including Wi-Fi, WiMAX, LTE, and/or VoIP. In embodiments, a single radio may be configured to support multiple different wireless technologies, and/or multiple radios may be individually configured to support specific wireless technologies. The power supply 110 provides electrical power to the device 100 and its components at a level that is at least sufficient for operation(s).

The I/O port(s) 114 enable the device 100 to be logically coupled to other devices including the I/O component(s) 112. Examples of I/O components include a microphone, a mouse, a keyboard, a game controller, a satellite dish, an optical scanner, a printer, and the like. The presentation component 116 operates to prepare data for presentation to a person or another device. Examples of presentation components include a visual display device, a sound generating device (e.g., speaker or amplifier), a printer device, a haptic feedback generating device (e.g., vibration), and the like.

In an embodiment, the exemplary device is a base station. In yet another embodiment, the exemplary device is user equipment. In yet another embodiment, the exemplary device is a gateway or a server operating in a telecommunications environment.

Figure 2:
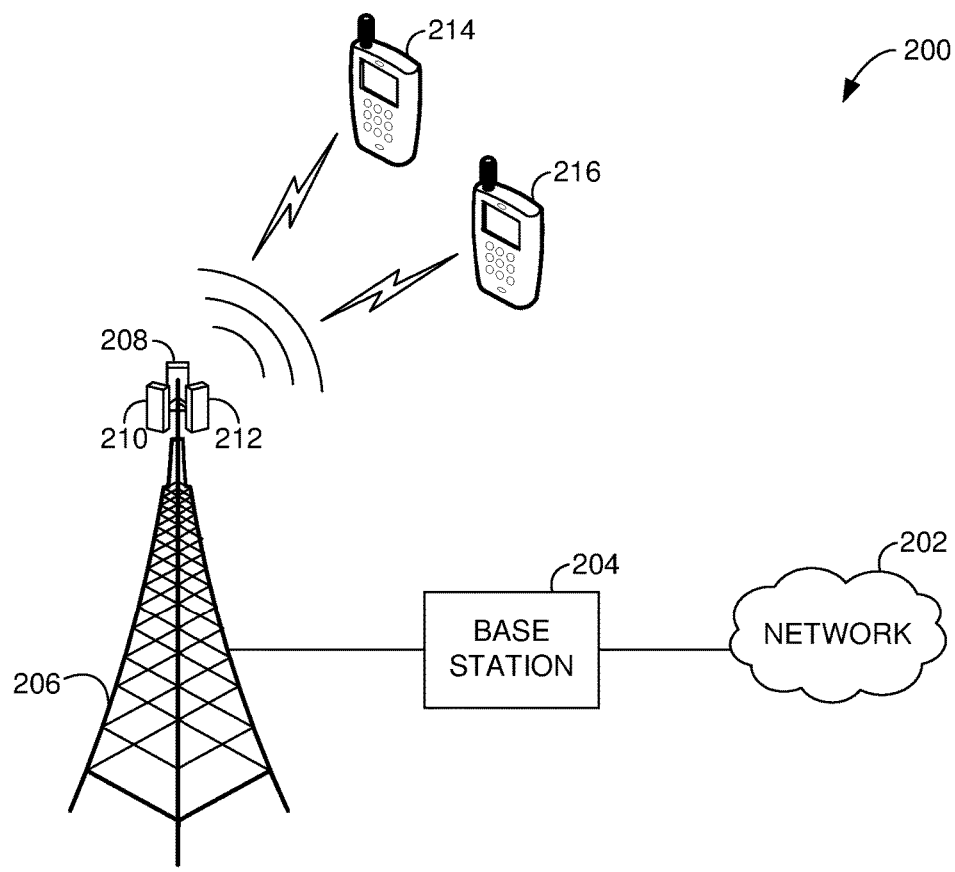
FIG. 2 depicts an exemplary telecommunications environment, in accordance with an embodiment of the present invention.

FIG. 2 is an illustration of an exemplary telecommunications environment 200, in accordance with the present invention. In embodiments, the telecommunications environment 200 comprises a network 202, a base station 204, and a cell site 206 having first, second, and third antennas 208, 210, and 212. Generally, the telecommunications environment 200 facilitates two-way communication between user equipment 214 and 216 and the network 202 via the cell site 206 controlled by the base station 204. In embodiments, the cell site 206 represents a peripheral node, while the network 202 in the telecommunications environment 200 represented in FIG. 2 represents a backhaul or core network supporting telecommunications operations. The network 202 is a telecommunications network that provides voice and data services to user equipment, in embodiments. The network comprises hardwired and wireless connections, including connections between centralized servers, gateways, and one or more base stations connected to one or more cell sites, for example. The network 202 may operate in one or more of a frequency division duplexing (FDD) or time division duplexing (TDD) manner. In embodiments, the network 202 uses Long Term Evolution (LTE) technology.

In embodiments, the network 202 provides telecommunication services to user equipment 214 and 216, via the base station 204 and cell site 206. Examples of user equipment include mobile telephones, smartphones, tablets, one and two-way pagers, smart watches, laptops, personal computers (PC), laptop computers, electronic readers (e-reader), personal digital assistants (PDA), and/or handheld scanners, etc. User equipment includes devices that are capable of connecting to or accessing wireless networks using an air interface, via radio frequency (RF) and/or infrared (IR) communications. User equipment may also include memory, a processor, and/or computer-readable media.

The base station 204 is a base transceiver station (BTS) that connects the cell site 206 to the network 202 and handles two-way communications between the cell site 206 and the network 202. In embodiments, the base station 204 connects a large-scale coverage component to the network 202 at one or more cell sites. For example, the base station 204 may connect one or more cell towers at different cell sites, spread over a geographic region, to the network 202. The base station 204 may monitor, track, and/or store logs in a database of all or some of the communications sent and received via one or more large-scale coverage components at any number of cell sites. In embodiments, the base station 204 controls a large-scale coverage component such as a cell tower, shown at the cell site 206 of FIG. 2. For example, the base station 204 may be associated with the cell site 206 having multiple antennas (e.g., 208, 210, and 212), where that cell site 206 is capable of communicating RF transmissions in multiple carrier bands (i.e., a first carrier band, a second carrier band, a third carrier band). In an embodiment, the base station 204 is an evolved node B (eNodeB) that connects the hardware, device, and components of a cell tower to a network 202. The base station 204 handles the communications, such as voice data, non-voice data, GPS data, and/or synchronization data, that is wirelessly sent or wirelessly received using the first, second, and third antennas 208, 210, and 212 of the cell site. The base station may comprises a processor and memory, in some embodiments. In an embodiment, the base station 204 is able to configure, power up, power down, change operations of, and manipulate each individual antenna or antenna array (e.g., beam steering) and other components (e.g., sensors, cooling devices) at a cell tower. In an embodiment, the base station 204 comprises a scheduler for scheduling communications on resource blocks. In an embodiment, the base station 204 may perform special processing on data packets including granting access to a client machine, logging or not logging an event, or network address and port translation.

In some embodiments, the base station 204 connects one or more small-scale coverage components to the network 202. Small-scale coverage components provide a smaller coverage area to user requirement, relative to a large-scale coverage component such as a cell tower. In an embodiment, the base station 204 connects multiple small-scale coverage components, such as femtocells and/or picocells, to the network 202. In another embodiment, the base station 204 is a femtocell or picocell such that the base station 204 is co-located with the antennas. In embodiments where the base station 204 connects a small-scale coverage component to the network 202, the base station 204 extends service coverage to indoor areas that are not easily and/or completely penetrated by cell tower signals, where line of sight to a cell tower is diminished or obstructed, and/or may add network capacity in areas with dense network traffic (e.g., a train station, a sports arena, a high rise office building), via the antenna of the small-scale coverage component.

Although shown in FIG. 2 as a single base station 204, the telecommunications environment 200 may include more than one base station. At any given time, one base station may control and manage communications of one cell site, or one base station may control and manage communications at multiple cell sites.

The base station handles two-way communications between the cell site 206 and the network 202. The cell site 206 of FIG. 2 includes a large-scale access component that is a cell tower having first, second, and third antennas 208, 210, and 212 affixed to the cell tower. In other embodiments, the cell site 206 includes a small-scale access component. The first, second, and third antennas 208, 210, and 212 may include one or more of a directional antenna and/or omnidirectional antenna, in embodiments. As used herein, "antenna" and "antenna array" are used interchangeably and should not be construed as limiting in number or type. Although three antennas are illustrated in FIG. 2, any number of antennas are contemplated for use with the present invention and are considered to be within the scope of the invention.

Figure 3:
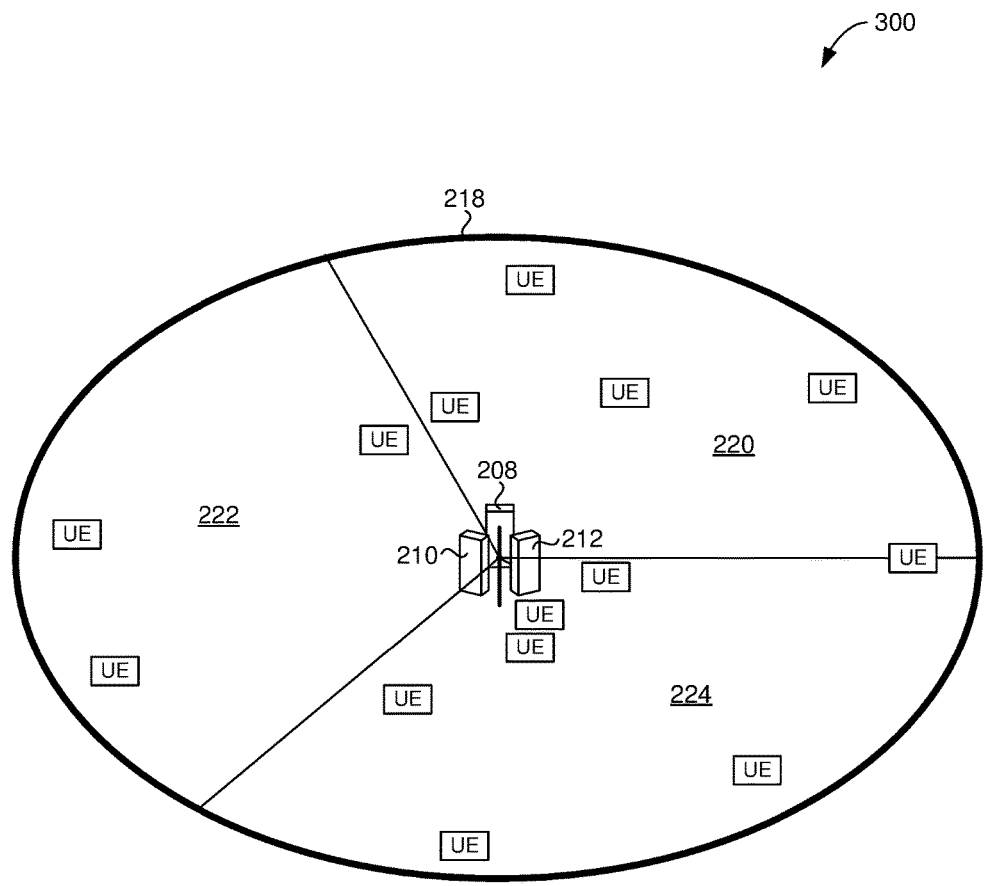
FIG. 3 depicts an exemplary schematic of the cell site, in accordance with an embodiment of the present invention.

An exemplary schematic 300 of the cell site 206 is depicted in FIG. 3, in accordance with the present invention. In the telecommunications environment 200, the cell site 206 has a service coverage area 218 that is determined by the first, second, and third antennas 208, 210, and 212 co-located at the cell site 206. User equipment within the service coverage area 218 of the cell site 206, also known as the "range" of the cell site, may be provided with telecommunications services (e.g., voice, data, messaging, internet, application, and/or location services) and connection to the network 202. Each of the first, second, and third antennas 208, 210, and 212 has a radio frequency (RF) radiation pattern that may be described as a sector of a cell site 206. Accordingly, the service coverage area 218 of the cell site 206 may be represented as sectors, wherein there is one sector for each of one the first, second, and third antennas 208, 210, and 212, for example. As shown in FIG. 3, the cell site 206 includes a first sector 220, a second sector 222, and a third sector 224. The service coverage area 218 of the cell site 206 may be described using 360 degrees, which is comprised of the first, second, and third sectors 220, 222, and 224, for example, where each sector comprises a portion of 360 degrees. Each sector generally corresponds to one of the first, second, and third antennas 208, 210, and 212. In FIG. 3, the first sector 220 corresponds to the first antenna 208, the second sector 222 corresponds to the second antenna 210, and the third sector 224 corresponds to the third antenna 212. Although the first, second, and third sectors 220, 222, and 224 appear the same or similar in size and shape, the exemplary schematic of FIG. 3 is a simplification. The first, second, and third sectors 220, 222, and 224 may be different sizes and shapes, and each of the first, second, and third sectors 220, 222, and 224 may comprise unequal portions of the whole service coverage area 218 of the cell site 206. In an embodiment, one or more of the first, second, and third sectors 220, 222, and 224 may be the same size and the same shape, relative to one another and/or the whole service coverage area 218. In another embodiment, one or more of the first, second, and third sectors 220, 222, and 224 may be similar in relative size, but different in shape, relative to one another and/or the whole service coverage area 218. In yet another embodiment, one or more of the first, second, and third sectors 220, 222, and 224 share the same or similar shape, but are different in size, relative to one another and/or the whole service coverage area 218.

For example, one of the first, second, or third sectors 220, 222, and 224 may comprise half or more than half of the whole service coverage area 218. In another example, one of the first, second, or third sectors 220, 222, and 224 may comprise less than or equal to 25% of the whole service coverage area 218. In yet another example, one of the first, second, or third sectors 220, 222, and 224 may comprise similar portions (e.g., all sectors being equal to or about 33% or 120 degrees) of the whole service coverage area 218, plus or minus an allowance relative to the other portions and/or the whole service coverage area 218 (e.g., +/−three percent relative to one another, or +/−ten degrees). In one example, the first, second, and third sectors 220, 222, and 224 comprise portions of the whole service coverage area 218 represented by ratios, such as the first sector 220 comprising one third (⅓) of the whole service coverage area 218, the second sector 222 comprising one fourth (¼) of the whole service coverage area 218, and the third sector 224 comprising the remaining portion (⁷⁄₁₂) of the whole service coverage area 218. In another example, the first, second, or third sectors 220, 222, and 224 comprise portions of the whole service coverage area 218 and are represented by degrees, such as the first sector 220 comprising 143 degrees of the whole service coverage area 218 of 360 degrees, the second sector 222 comprising 127.5 degrees of the whole service coverage area 218, and the third sector 224 comprising the remaining portion of 89.5 degrees of the whole service coverage area 218.

Each sector corresponds to a radiation pattern of a corresponding antenna at the cell site 206. The shape, size, and dimension(s) of the service coverage area 218 of the cell site 206 are, generally, determined by an antenna's specific radiation pattern, as well as a direction, electrical tilt, mechanical tilt, installation height above the ground or surrounding geographic area, technical operating specifications, materials, obstructions (i.e., buildings, mountains, or other elevations), and power supplied to each of the first, second, and third antennas 208, 210, and 212 of the cell site 206, for example. The first, second, and third antennas 208, 210, and 212 wirelessly receive and transmit RF transmissions to and from, for example, user equipment, other antennas, other cell sites, base stations, and/or satellites, in order to facilitate communications between such devices, though not shown in FIG. 3 for clarity. In an embodiment, the first, second, and third antennas 208, 210, and 212 of the cell site 206 capture two-way communications between the network 202 and user equipment devices that are within a geographic area corresponding to the service coverage area 218 of the cell site 206.

Figure 4:
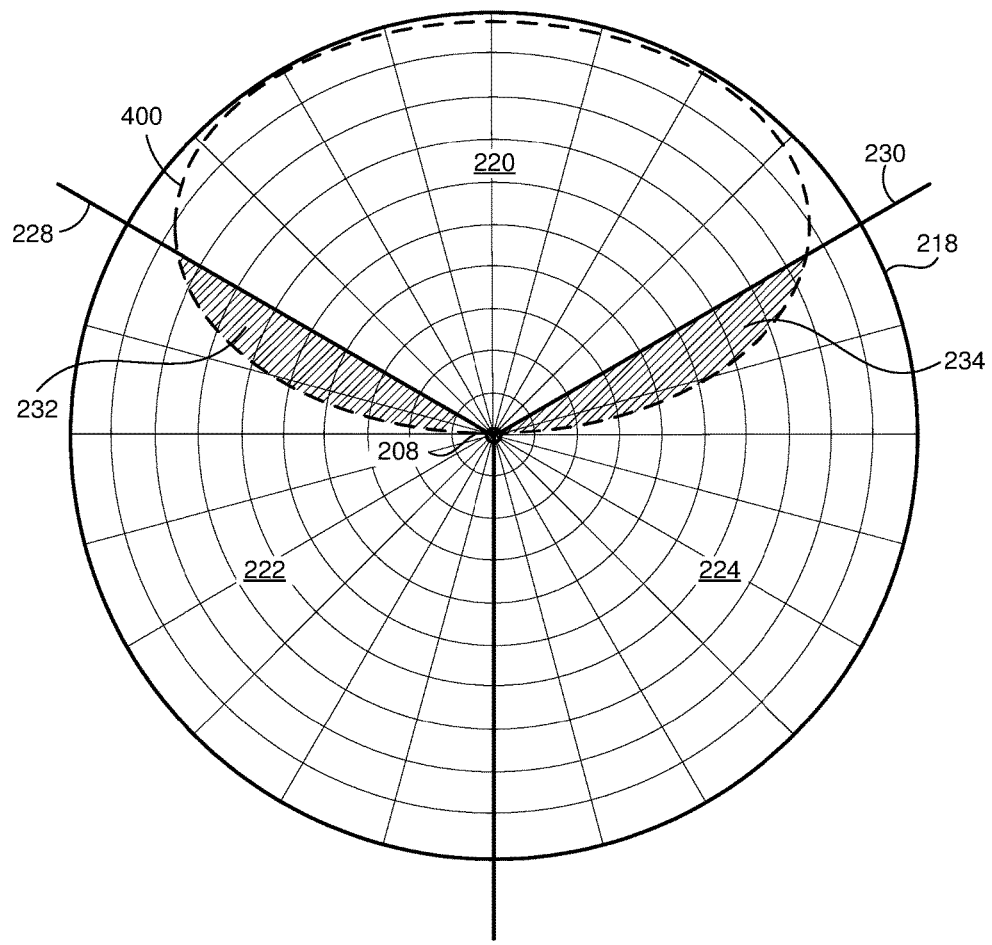
FIG. 4 depicts an exemplary radio frequency radiation pattern of an antenna, in accordance with an embodiment of the present invention.

FIG. 4 illustrates an exemplary RF radiation pattern 400 of a first antenna 208 at the cell site 206. A horizontal view of the RF radiation pattern is illustrated in a simplified manner for the purposes of this discussion. However, RF radiation patterns are complex, and therefore, the pattern in actuality has irregular boundaries, is asymmetrically shaped, is influenced by manufacture, design, and materials, and is further influenced by the amount of power supplied to the corresponding antenna, among other factors. The horizontal view of the RF radiation pattern 400 is diagrammed as a polar plot of power (e.g., quantified in decibels) and direction(s) (e.g., described in degrees) of the radiation of the first antenna 208. It will be understood that the RF radiation pattern is a reciprocal representation of the power being radiated and/or being received by the antenna or antenna array. As such, where the radiation power is greatest, the capability of the antenna to receive and send RF signals is greatest.

For example, the first antenna 208 radiates outward from a cell tower of a cell site 206. The desired area of radiation corresponds to the first sector 220 of the cell site 206, wherein the first sector 220 is delineated by lines 228 and 230. It will be understood that lines 228 and 230 are hypothetical markers. When power is supplied to the first antenna 208, the RF radiation of the first antenna 208 expands beyond the desired area of radiation, the first sector 220, as indicated by lines 228 and 230. The RF radiation expands beyond the first sector 220 and into the other sectors, including the second and third sectors 222 and 224. This RF radiation extending outside of the first sector 220 is undesirable because the RF radiation outside of the first sector 220 interferes with the desired RF radiation in other sectors (i.e., corresponding to other antennas) at the same cell site 206. The undesired RF radiation of the first antenna 208 that expands beyond the corresponding first sector 220 is referred to as "spillover." As shown in FIG. 4, an area 232 of undesired RF radiation of the first antenna 208 expands into the second sector 222. Another area 234 of undesired RF radiation of the first antenna 208 expands into the third sector 224. It is noted that, in actuality, some spillover may be tolerated as the spillover may be used to facilitate handoffs of user equipment moving from one sector to another at the cell site 206. In addition to antenna-to-antenna RF noise, spillover RF radiation is undesirable because it is an inefficient use of power supplied to the first antenna 208 at the cell site 206. Recall that the horizontal view of the RF radiation pattern 400 is diagrammed as a polar plot of power (e.g., quantified in decibels) and direction(s) (e.g., described in degrees) of the radiation of the first antenna 208. Therefore, the undesired RF radiation in the area 234 provides redundant service coverage to the third sector 224 corresponding to third antenna 212 and the undesired RF radiation in the area 232 provides redundant service coverage to the second sector 222 corresponding to the second antenna 210. The areas 232 and 234 represent an inefficient use of power or RF radiation that is "lost" power of the first antenna 208.

The ratio of the desired RF radiation in the first sector 220 of the first antenna 208 to the undesired RF radiation out of the first sector 220 of the first antenna 208 may be quantified. The sector power ratio (SPR) quantifies the power of RF radiation that is outside of the sector of an antenna relative to the power of the RF radiation radiated within the same sector of the same antenna. As such, the SPR represents the power of the undesired RF signal relative to the power of the desired RF signal, for a particular antenna. It will be understood that SPR is a measure of power, and for the purposes of this discussion references to undesired RF radiation will be understood to be a reference to the amount of power of the undesired RF radiation. Thus, as undesired RF spillover of an antenna increases, the SPR of the same antenna increases and vice versa, when all other factors are controlled. As undesired RF spillover and SPR increase, interference and noise increase at the cell site 206. Accordingly, SPR may be used as a predictor, indictor, and/or measure of an antenna's likelihood of causing interference and noise, or actual causation of interference and noise. SPR may be affected by orientation (i.e., how the service coverage area has been partitioned into sectors), electrical tilt, mechanical tilt, carrier band associated with an antenna, technical operating specifications of an antenna, manufacturing and materials of an antenna, environmental conditions (i.e., weather, heat, wear and tear), and power supplied to an antenna, for example.

The undesired RF spillover of an antenna, which causes interference and noise, negatively affects wireless communications between user equipment and other antennas at a cell site 206. For example, the "signal to interference plus noise ratio" (SINR) for user equipment in the undesired spillover area may indicate that the user equipment is experiencing poor signal quality. A low value for SINR indicates that signal quality is poor, whereas a high value for SINR indicates that signal quality is good. Additionally, the undesired RF spillover of an antenna produces noise for adjacent antennas. When noise levels increase at the cell site, the base station controlling the cell site uses more of its resources in order to "hear" and/or receive incoming RF transmissions over the noise at the cell site.

The negative impacts of increased or high SPR values is exacerbated in LTE environments that allow and facilitate multiple carrier bands and carrier aggregation. Carrier aggregation technology enables user equipment to combine multiple carrier bands and use the combined carrier bands for uplink and/or downlink communications, as opposed to non-aggregation technology that limits user equipment to using one carrier band for all uplink and downlink communications. For example, the cell site 206 and user equipment that is not carrier-aggregation capable are able to communicate using an allotment of 10 MHz in one band, which is limited. In contrast, the cell site 206 and carrier-aggregation capable user equipment may communicate by combining an allotted 10 MHz in a first band (e.g., B41) with an allotted 10 MHz in another band (e.g., B21), thereby increasing the available bandwidth for he communications to 20 MHz. Accordingly, carrier aggregation may be used to increase bandwidth and throughput of communications between the cell site 206 and user equipment, thereby improving telecommunications service experienced by consumers. Inter-carrier aggregation refers the combining frequencies in different carrier bands. In contrast, intra-carrier aggregation refers to combining frequencies within one band.

For example, user equipment in the service coverage area 218 of the cell site 206 may be capable of communicating using inter-carrier aggregation. Each carrier band corresponds to one of the first, second, and third antennas 208, 210, and 212 at the cell site 206, in embodiments. For example, the cell site 206 has first, second, and third antennas 208, 210, and 212. In embodiments, the first antenna 208 may operate to provide RF transmissions (radiation) in a first band (e.g., a RF range spanning 2.496-2.690 GHz and referred to as 2.5 GHz), the second antenna 210 may operate to provide RF transmissions in a second band (e.g., a RF range spanning 1850-1915, 1930-1995 MHz and referred to as 1900 MHz), and the third antenna 212 may operate to provide RF transmissions in a third band (e.g., a RF range spanning 814-894 MHz and referred to as 800 MHz). These exemplary bands/RF ranges are described herein as examples and are not to be construed as limiting the embodiments of the present invention. Different bands/RF ranges are contemplated and possible for use in various embodiments without departing from the scope of the present invention. For example, carrier bands may refer to spectrums in any of the low band (e.g., Band 71/600 MHz, 700 MHz), the mid band (e.g., PCS, AWS1/2/3/4), and the high band (e.g., WCS/2.3 GHz, EBS/BRS 2.5 GHz, 24 GHz, 29 GHz, 29 GHz, and 39 GHz spectrums, and 5G mobile network bands), for example, each of which is considered to be within the scope of the invention, but which are not limiting.

Claimed embodiments of the present invention dynamically reduce and/or mitigate the negative impacts caused by undesired RF radiation of antennas at a cell site using SPR values in a carrier aggregation capable telecommunications environment.

Figure 5:
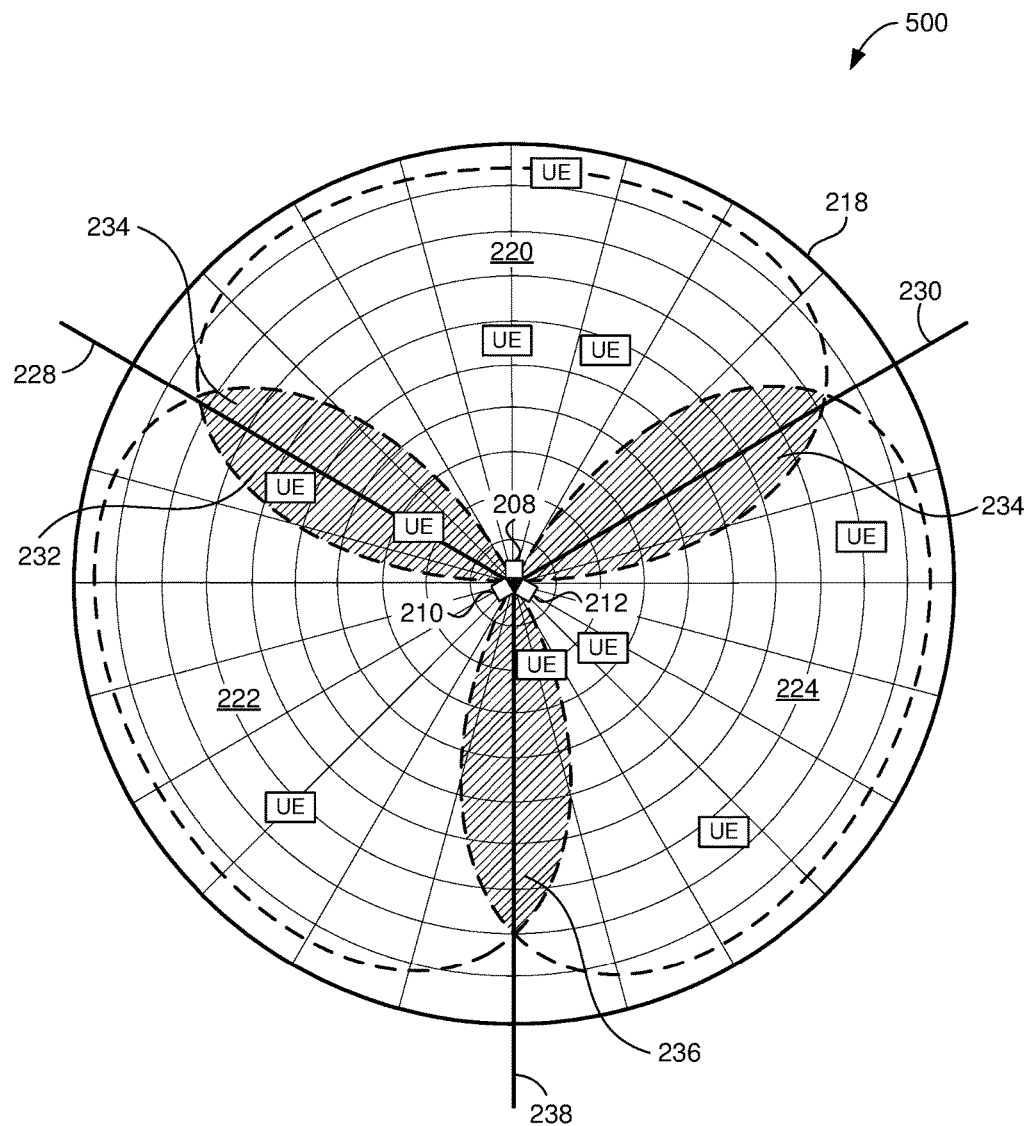
FIG. 5 depicts exemplary radio frequency radiation patterns of antennas, in accordance with an embodiment of the present invention.

Turning to FIG. 5, exemplary RF radiation patterns 500 of the first, second, and third antennas 208, 210, and 212 at the cell site 206 are depicted. A horizontal view of the RF radiation patterns are illustrated in a simplified manner for the purposes of this discussion. As depicted, the first antenna 208 radiates undesired RF into the second and third sectors 222 and 224, the second antenna 210 radiates undesired RF into the first and third sectors 220 and 224, and the third antenna 212 radiates undesired RF into the first and second sectors 220 and 222. Accordingly, area 232 represents undesired RF radiation from the first antenna 208 expanding into the second sector 222 and undesired RF radiation from the second antenna 210 reciprocally expanding into the first sector 220. Similarly, area 234 represents undesired RF radiation from the first antenna 208 expanding into the third sector 224 and undesired RF radiation from third antenna 212 reciprocally expanding into the first sector 220. Finally, area 236 represents undesired RF radiation from the third antenna 212 expanding into the second sector 222 and undesired RF radiation from the second antenna 210 reciprocally expanding into the third sector 224. Area 236 transverses the line 238 delineating the desired areas of RF radiation of the second and third sectors 222 and 224. It will be understood that line 238 is a hypothetical marker. Accordingly, each of the areas 232, 234, and 236 represents undesired RF radiation spillover between the first, second, and third antennas 208, 210, and 212 at the cell site 206.

The SPR for each of the first, second, and third antennas 208, 210 and 212 may be calculated using the RF radiation patterns 500. For example, the SPR of the first antenna 208 accounts for the power of its undesired RF signal relative to the power of its the desired RF signal. The SPR of the first antenna 208 quantifies the amount of power of the undesired RF radiation contributed by the first antenna 208 to areas 232 and 234 relative to the amount of power of the desired RF radiation in the first sector 220 of the first antenna 208. Similarly, the SPR of the second antenna 210 quantifies the amount of power of the undesired RF radiation contributed by the second antenna 210 to areas 232 and 236 relative to the amount of power of the desired RF radiation in the second sector 222 of the second antenna 210. The SPR of the third antenna 212 quantifies the amount of power of the undesired RF radiation contributed by the third antenna 212 to areas 234 and 236 relative to the amount of power of the desired RF radiation in the third sector 224 of the third antenna 212. Due to spillover between the first, second, and third antennas 208, 210, and 212, the areas 232, 234, and 236 are associated with the presence of interference and noise.

Because SPR is a ratio, SPR may be represented using a percentage value or numerical value. As such, the first antenna 208 may have an SPR of 3% while the second antenna 210 may have an SPR of 5.5%, in one example. Antennas with greater spillover areas (i.e., power and direction are plotted in FIG. 5) have greater SPR values.

Figure 6:
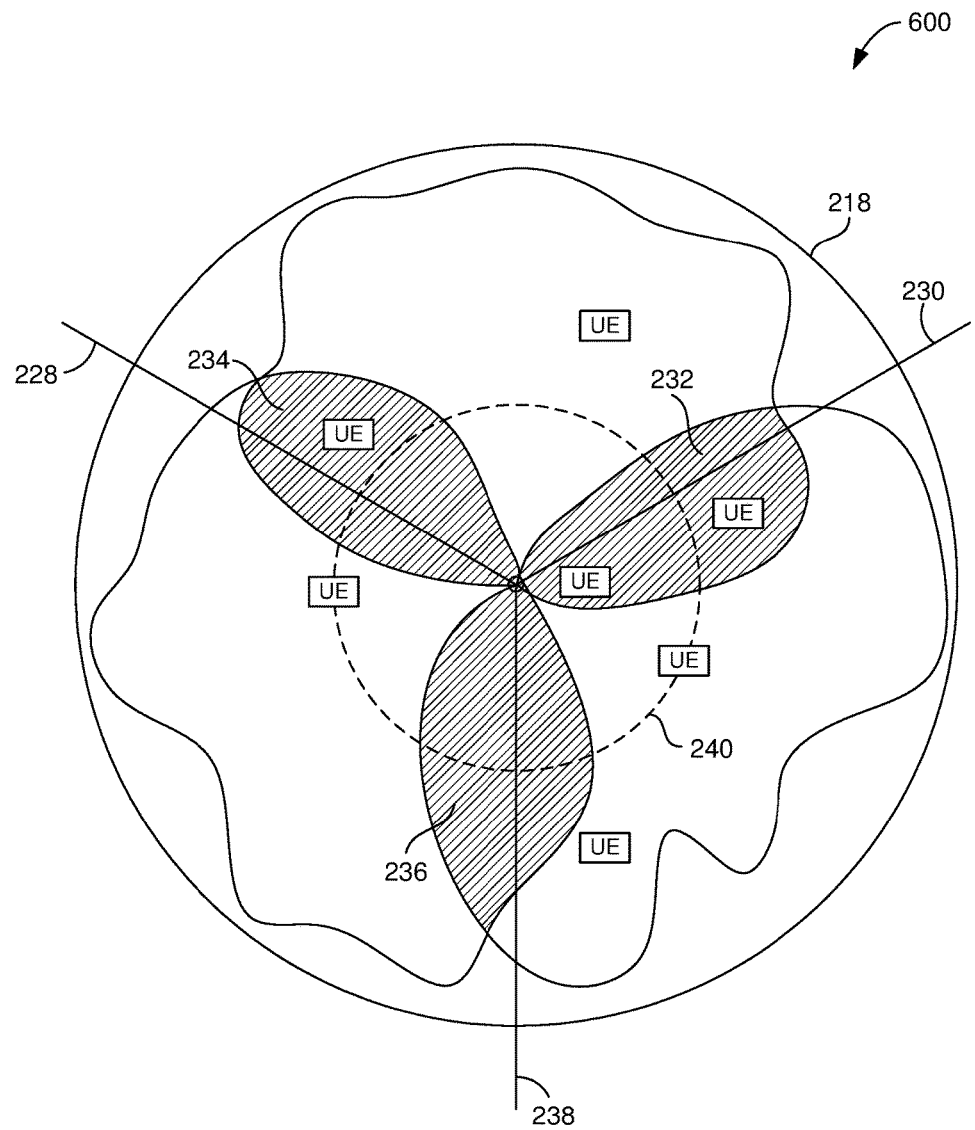
FIG. 6 depicts a view of another exemplary radio frequency radiation pattern of antennas, in accordance with an embodiment of the present invention.

Moving to FIG. 6, another exemplary RF radiation pattern 600 of the first, second, and third antennas 208, 210, and 212 at the cell site 206 is depicted. For the purposes of discussion, some irregularity has been introduced to the RF radiation patterns of the first, second, and third antennas 208, 210, and 212, and the polar plot lines have been removed. For example, the undesired RF radiation from the second antenna 210 into the first sector 220 is greater than the undesired RF radiation from the first antenna 208 into the second sector 222, creating asymmetries and producing SPR values unique to each of the first, second, and third antennas 208, 210, and 212. At FIG. 6, a proximity marker 240 is shown. In FIG. 6, a proximity marker 240 corresponds to a predefined distance measured from the interior of the cell site 206, for example. In embodiments, the predefined distance is measured from a centralized geographic location corresponding to a large-scale component or a small-scale component. In one example, the predefined distance is determined or measured relative to a cell tower or one or more antennas at a cell site. As the first, second, and third antennas 208, 210, 212 send and receive RF transmissions to user equipment throughout the service coverage area 218, user equipment physically located within the predefined distance indicated by the proximity marker 240 are in the path of the RF transmissions of the first, second, and third antennas 208, 210, and 212, including high-powered signals intended to reach user equipment that is physically located at or near the edge of the service coverage area 218, for example. In addition to user equipment location relative to the predefined distance, some user equipment is not located in areas 232, 234, and 236, while other user equipment is located in areas 232, 234, and 236. In embodiments, some user equipment is located within the predefined distance and within one of the areas 232, 234, and 236. User equipment that is located within the predefined distance and within one of the areas 232, 234, and 236 is likely to experience poor telecommunications service (e.g., low SINR) due to the interference and noise resulting from high-powered undesired RF radiation between sectors. Additionally, the undesired RF spillover produces noise for adjacent antennas. When noise levels increase at the cell site 206, the base station 204 controlling the cell site 206 must use more of its resources in order to "hear" and/or receive incoming RF transmissions over the noise at the cell site 206. These problems are compounded in a telecommunications environment wherein first, second, and third antennas 208, 210, and 212 send and receive RF communications in different carrier bands and user equipment is capable of carrier aggregation.

In order to reduce and/or mitigate the negative impacts caused by high-powered undesired RF radiation of antennas at a cell site, claimed embodiments of the present invention use SPR when assigning component carriers in a carrier aggregation capable telecommunications environment. As explained above, the sector power ratio (SPR) quantifies the power of RF radiation that is outside of the sector of an antenna relative to the power of the RF radiation radiated within the same sector of the same antenna. The negative impacts caused by high-powered undesired RF radiation at a cell site may be reduced or mitigated by assigning a carrier band of low-SPR antennas to component carriers for user equipment that are located at or near spillover areas and within the predefined distance of a large-scale or small-scale component, for example.

Figure 7:
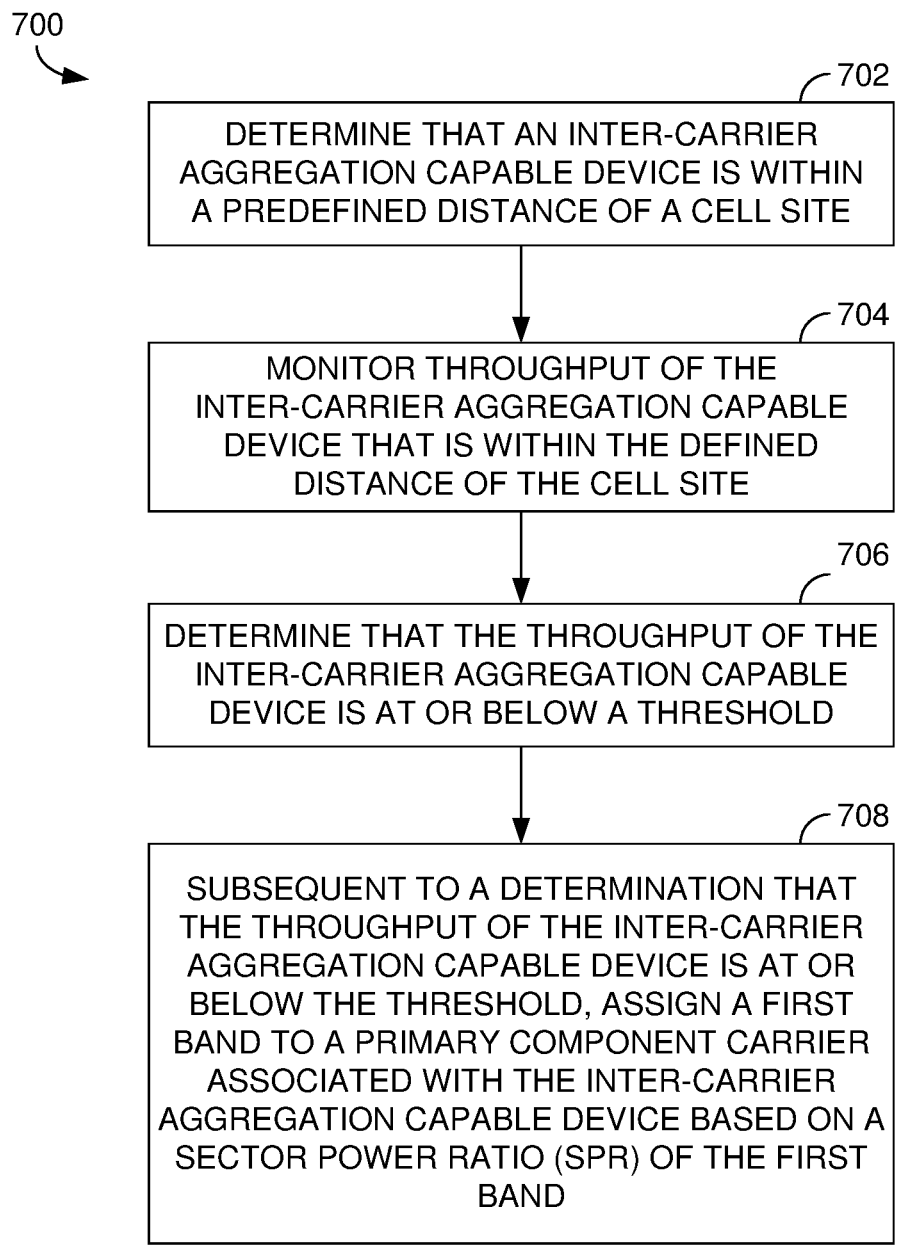
FIG. 7 depicts an exemplary method, in accordance with an embodiment of the present invention.

FIG. 7 depicts a method in accordance with the present invention. When user equipment enters the coverage area of a cell site, the user equipment may attempt to connect to the network by transmitting an RF communication to the cell site, for receipt and processing by the base station controlling the cell site. The user equipment may transmit information including mobile device specifications, such as whether the user equipment is capable of using carrier aggregation. The user equipment may transmit information including a mobile device identifier, a name associated with user equipment, GPS location, and/or customer service level, in some embodiments. In an embodiment, the user equipment may transmit information to the base station, via the cell site, during or as part of a request for authorization or acquisition of credentials process. In embodiments, the user equipment is an inter-carrier aggregation capable device.

At block 702, the method comprises determining that an inter-carrier aggregation capable device is within a predefined distance of a cell site. Generally, GPS location information of the inter-carrier aggregation capable device is obtained from the inter-carrier aggregation capable device and used to determine the location of the inter-carrier aggregation capable device relative to the sectors and corresponding antennas of the cell site. The base station uses the GPS location information of the inter-carrier aggregation capable device and location information for the cell site when locating the inter-carrier aggregation capable device. Using the GPS location information of the inter-carrier aggregation capable device, the base station may recognize that the inter-carrier aggregation capable device is located in a particular sector and is located within the predefined distance of the cell site. At FIG. 6, the predefined distance of a cell site corresponds to the proximity marker 240. The predefined distance may be stored in memory at the base station controlling the cell site and/or may be stored at a server in the backhaul of a network. In an embodiment, the predefined distance is identified using an identifier of the cell site. Additionally or alternatively, the predefined distance may be recognized using an identifier that is specific to one or more antennas of the cell site. In embodiments, the predefined distance may be determined by selecting a distance that is appropriate for a large-scale component, a small-scale component, the geographic "footprint" of the service coverage area of the cell site, and/or a set volume of user equipment within the coverage area of the cell site (e.g., urban location or rural location). In another embodiment, the predefined distance is provided to the base station by the cell site, where the cell site includes a memory.

A cell site may be associated with one predefined distance, in an embodiment. In another embodiment, one cell site may be associated with multiple predefined distances, each predefined distance being specific to particular scenarios or characteristics of the cell site that the base station may utilize in selecting one of the multiple predefined distances. In an embodiment, the base station controls multiple cell sites and accesses the same predefined threshold for all of the cell sites. Alternatively, in an embodiment, the base station controls multiple cell sites and accesses one or more predefined thresholds for each of the cell sites, wherein the one or more predefined threshold may be specific to one cell site or may be "shared" among the cell sites.

The base station may further determine whether the inter-carrier aggregation capable device is located at or near an undesired RF radiation spillover area, based on the GPS location information of the inter-carrier aggregation capable device.

At block 704, the method comprises monitoring throughput of the inter-carrier aggregation capable device that is within the defined distance of the cell site. In some embodiments, monitoring the throughput of the inter-carrier aggregation capable device comprises identifying a data rate of the inter-carrier aggregation capable device. In an embodiment, the inter-carrier aggregation capable device is tested in order to obtain throughput information, such as a data rate or bit rate. Throughput includes data rates on an uplink (i.e., user equipment sends information to the base station), data rates on a downlink (base station sends information to the user equipment) pathway, quality of service indicators, and the like. Throughput is used to determine whether the telecommunications services provided to the user equipment are being negatively impacted. For example, a slow or reduced data rate (e.g., bit rate) may indicated that the telecommunications services provided to the user equipment are being negatively impacted due to high-powered undesired RF radiation at the cell site when user equipment is located at or near spillover areas and within the predefined distance of a large-scale or small-scale component, for example. In embodiments, monitoring throughput of the inter-carrier aggregation capable device further includes obtaining a SINR value for the inter-carrier aggregation capable device. Additionally or alternatively, the method may obtain throughput information (e.g., bit rates, SINR values) of other inter-carrier aggregation capable devices at the cell site for comparison with the throughput of the inter-carrier aggregation capable device that is within the defined distance of the cell site.

In some embodiments, the method further comprises identifying a threshold. The threshold is a throughput threshold, in embodiments. In an embodiment, the throughput threshold specifies a target data rate for inter-carrier aggregation capable devices within the predefined distance of the cell site. As used herein, a "target" data rate refers to a desirable communication rate or an optimal data rate on the uplink and/or downlink of the inter-carrier aggregation capable device. A target data rate may be a predetermined minimum data rate or data rate cut-off set or defined by an entity such as a service provider, or a target data rate may be defined based on traffic history at one or more cell sites. The throughput threshold may be stored in a memory, for example, at the base station controlling the cell site and/or at a centralized server in the network. The throughput threshold may be associated with a customer service level of a user of the inter-carrier aggregation capable devices, in one embodiment. The throughput threshold may be associated with a model or manufacturer of the inter-carrier aggregation capable device, in an embodiment. The throughput threshold may be specific to the cell site, the antennas at the cell site, and/or one or more carrier bands associated with the antennas at the cell site. In an embodiment, the base station determines the number of carrier bands that the inter-carrier aggregation capable device is capable of aggregating. The base station may identify a throughput threshold specific to the number of carrier bands that the particular inter-carrier aggregation capable device is capable of aggregating. For example, the base station may recognize one throughput threshold for two-band inter-aggregation capable user equipment and recognize another, different throughput threshold for three-band inter-carrier inter-aggregation capable user equipment. In embodiments, a throughput threshold may be specific to a day of the week, a time of day associated with high traffic, and/or specific to a type of traffic (i.e., voice data, internet, video streaming, and/or GPS location use) associated with the time of day. In an embodiment, the method 700 identifies the threshold, and the threshold specifies the target data rate for an individual inter-carrier aggregation capable device, or all inter-carrier aggregation capable devices, as within the predefined distance of the cell site. In such an embodiment, the first band corresponds to an antenna at the cell site providing service to the inter-carrier aggregation capable device while the second band corresponds to another antenna at the same cell site.

Continuing to block 706, the method 700 comprises determining that the throughput of the inter-carrier aggregation capable device is at or below the threshold. Alternatively, if it is determined that the throughput of the inter-carrier aggregation capable device is above the throughput threshold, the method 700 may be terminated. When the throughput of the inter-carrier aggregation capable device is determined to be at or below the threshold, the base station may assume or deduce that the inter-carrier aggregation capable device is impacted by interference and noise resulting from the undesired RF spillover of the antennas at the cell site. Additionally, when the base station determines that the throughput of the inter-carrier aggregation capable device is at or below the threshold, the base station may use the GPS location information of the inter-carrier aggregation capable device to determine whether or confirm that the inter-carrier aggregation capable device is located near or within an undesired RF radiation spillover area of the cell site. In such an embodiment, the base station is able to determine that the inter-carrier aggregation capable device, within the predefined distance of the cell site, is also within an undesired RF spillover area associated with interference and increased noise.

In order to improve the throughput of the inter-carrier aggregation capable device determined to be within the predefined distance, the base station selects an antenna having a low SPR for assignment to the inter-carrier aggregation capable device, the antenna corresponding to a particular carrier band that may be used for uplink and/or downlink communications between the base station and the inter-carrier aggregation capable device.

In embodiments, component carriers are assigned to user equipment, such as the inter-carrier aggregation capable device, when the user equipment enters the service coverage area of the cell site. Component carriers may be classified as primary or secondary. A primary component carrier (PCC) refers to a main carrier that handles control signaling. The base station is generally responsible for assigning a primary downlink carrier and an associated uplink primary component carrier to user equipment that enters the service coverage area of the cell site controlled by the base station. Secondary component carriers (SCC) are auxiliary carriers used to boost uplink and/or downlink data rates. Secondary component carriers may be activated and deactivated at any time. In embodiments, the carriers may be FDD, TDD, or a mix of FDD and TDD with location in one or multiple frequency bands.

Accordingly, the method 700 assigns a first band to a primary component carrier associated with the inter-carrier aggregation capable device based on a sector power ratio (SPR) of the first band, shown at block 708. The assignment of a band corresponding to a low-SPR antenna at the cell site improves the at-or-below-threshold throughput of the inter-carrier aggregation capable device. In an embodiment, a band corresponding to the antenna having the lowest SPR at the cell site relative to all other band(s) at the cell site is assigned to the primary component carrier. In another embodiment, a band corresponding to one antenna having an SPR value that is less than an SPR value of another adjacent antenna at the cell site is assigned to the primary component carrier. Accordingly, the method 700 determines the SPR of the first band is lower than at least one other band at the cell site prior to assigning the first band to the primary component carrier. For example, the method 700 may determine that the SPR of the first band is lower than other bands at the cell site prior to assigning the first band to the primary component carrier. Such a determination is used when assigning a band to the primary component carrier and assigning other bands to secondary component carriers, for example.

Because SPR values may be affected by orientation (i.e., how the service coverage area has been partitioned into sectors), electric tilt, mechanical tilt, specific frequencies of a carrier band associated with an antenna, technical operating specifications of an antenna, manufacturing and materials of an antenna, environmental conditions, and power supplied to an antenna, SPR values of antennas at the cell site may be determined dynamically when a user equipment enters the service coverage area of the cell site. Alternatively, SPR values of the antennas at the cell site may be determined periodically and stored in memory at the base station controlling the cell site, and referenced when a user equipment enters the service coverage area of the cell site. Additionally or alternatively, SPR values of the antennas at the cell site may be determined for individual antennas when each antenna is installed at the cell site and stored in memory at the base station controlling the cell site. In this way, dynamically determined or periodically updated SPR values may be compared, for example, by the base station to an initial or installation SPR value so that the performance of each antenna can be monitored, for example.

Continuing with the method 700, in a further embodiment, assigning the lowest SPR antenna and corresponding band to the primary component carrier may occur when the throughput is at or below a threshold. Subsequent to determining that the throughput is above the threshold, assignment of bands to the primary component carrier may be performed independent of SPR values. For example, when it is determined that the throughput of an inter-carrier aggregation capable device is above the threshold, the primary component carrier assignment may proceed to examine other factors, such as traffic load at the antennas, independent of SPR values.

In further embodiments, the method 700 assigns a second band to a secondary component carrier associated with the inter-carrier aggregation capable device, wherein the second band is associated with an SPR that is greater than the SPR associated with the first band. In an embodiment, the method 700 assigns a third band to a tertiary component carrier associated with the inter-carrier aggregation capable device, wherein the third band is associated with an SPR that is greater than the SPR associated with the second band. In embodiments, the method 700 concurrently provides service to the at least one inter-carrier aggregation capable device via the first band for the primary component carrier and a second band for the secondary component carrier. As used herein, the term "concurrently" covers embodiments in TDD and FDD implementations. Accordingly, concurrent service to the inter-carrier aggregation capable device is maintained, albeit the use of different bands via inter-carrier aggregation may introduce time and frequency divisions for uplink and downlink communications between the inter-carrier aggregation capable device and a base station, via the cell site. In embodiments, the method 700 is performed on a per-device basis. As such, when a new inter-carrier aggregation capable device is recognized as being within the predefined distance of the cell site, the method 700 comprises monitoring throughput of the new inter-carrier aggregation capable device. In embodiments, the method 700 further comprises determining that the throughput of the new inter-carrier aggregation capable device is at or below the threshold. The method 700 continues by assigning the first band to a primary component carrier associated with the new inter-carrier aggregation capable device based on the SPR of the first band. Additionally, the method 700 may assign a second band and/or a third band to secondary component carriers associated with the new inter-carrier aggregation capable device. For example, the method 700 may assign a second band to a secondary component carrier associated with the at least one inter-carrier aggregation capable device based on determining that the throughput of the inter-carrier aggregation capable device is at or below the threshold, wherein the SPR of the first band is less than the SPR of the second band. In an example, the method 700 may further assign a third band to a tertiary component carrier associated with the inter-carrier aggregation capable device. Assignment of the third band may be based on the third band being associated with an SPR that is greater than the SPR associated with the second band. Additionally or alternatively, assignment of the third band may be based on the determination that the throughput of the inter-carrier aggregation capable device is at or below the threshold, for example.

Figure 8:
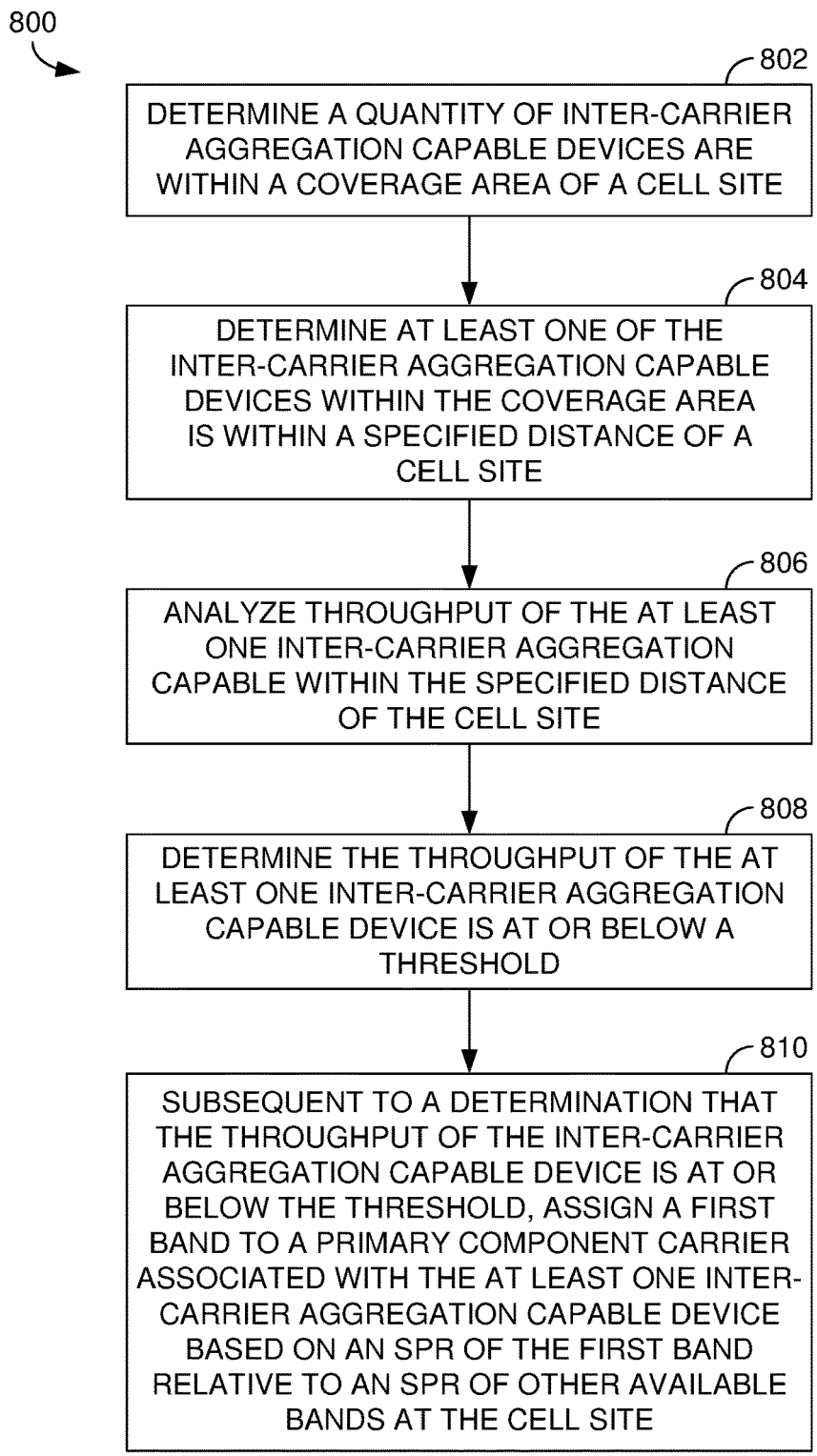
FIG. 8 depicts another exemplary method, in accordance with an embodiment of the present invention.

Turning to FIG. 8, another method 800 is depicted, in accordance with the present invention. At block 802, the method 800 comprises determining a quantity of inter-carrier aggregation capable devices that are within a coverage area of a cell site. Additionally, the method 800 may determine a quantity of devices within the coverage area of the cell site, before, during, or after determining the quantity of inter-carrier aggregation capable devices within range of the cell site. The method 800 determines whether any of the inter-carrier aggregation capable devices are within a predefined or specified distance of the cell site. In embodiments, the method 800 identifying at least one of the inter-carrier aggregation capable devices that is within the coverage area is within a specified distance of the cell site, shown at block 804. In embodiments, the specified distance corresponds to a set distance measured from a centralized geographic location corresponding to a large-scale component or a small-scale component. The specified distance may be defined as a percentage (e.g., 50% or less) of the radius of the whole service coverage area of the cell site. For example, the specified distance corresponds to the exemplary proximity marker 240 of FIG. 6. The specified distance may be stored in memory at the cell site, the base station controlling the cell site, and/or a centralized server in a network, for example. The specified distance may be preset and static, in some embodiments. The specified distance may increase when traffic load is high at the cell site and decrease when traffic load is low at the cell site, in some embodiments. Low and high traffic loads may be predetermined values accessed by the base station, and may further be specific to the cell site (e.g., large-scale or small-scale), the cell site geographic location, the average traffic load of the cell site, average traffic load at neighboring cell sites, and the like. The specified distance may be stored in a database and identified or recognized by the base station using an identifier of the cell site, the geographic location of the cell site, and/or information from the antennas of the cell site.

Continuing, the method 800 identifies at least one of the inter-carrier aggregation capable devices within the coverage area that is within a specified distance of the cell site. At block 806, the method 800 analyzes throughput of the at least one inter-carrier aggregation capable device within the specified distance of the cell site. Additionally, the method 800 may analyze the throughput of one or more of the devices that are not capable of inter-carrier aggregation. In embodiments, analyzing the throughput of the at least one inter-carrier aggregation capable device within the specified distance of the cell site further comprises identifying and/or determining how many bands the at least one inter-carrier aggregation capable device is capable of utilizing. Throughput may be affected by the number of carrier bands that may be aggregated due to the increased bandwidth enabled by carrier aggregation. The method 800 may identify a threshold that is specific to the number of bands that the at least one inter-carrier aggregation capable device is capable of utilizing (e.g., two bands, three bands, five bands).

At block 810, the method determines that the throughput of the at least one inter-carrier aggregation capable device is at or below a threshold, in embodiments. At block 808, the method assigns a first band to a primary component carrier associated with the at least one inter-carrier aggregation capable device based on an SPR of the first band relative to an SPR of other available bands at the cell site. In assigning the first band to the primary component carrier, the first band may be assigned to uplink communications, downlink communications, or both communications. In embodiments, the primary component carrier of the device may be assigned one carrier for uplink communications and another carrier for downlink communications. In further embodiments, the method assigns a second band to a secondary component carrier associated with the at least one inter-carrier aggregation capable device, wherein the SPR of the first band is less than the SPR of a second band. Additionally or alternatively, the secondary component carriers of the device may be assigned one carrier for uplink and downlink communications, or may be assigned different carriers for uplink and downlink communications. Various combinations may be implemented without deviating from the present invention and are contemplated to be within the scope of the present invention. In embodiments, a second band is assigned to a secondary component carrier associated with the at least one inter-carrier aggregation capable device, when the second band is determined to have an SPR that is less than the SPR of the first band but that is greater than the SPR of a third band. In such an embodiment, a third band is assigned to a tertiary component carrier when the third band is determined to have the highest SPR relative to an SPR of the first band and second bands. Alternatively, once a low SPR band or the lowest SPR band at the cell site is assigned to the primary component carrier for an inter-carrier aggregation capable device, the subsequent assignments of remaining carrier bands to secondary and/or tertiary component carriers may be random, may be based on traffic load of antennas at the cell site, or may be based on a number of other inter-carrier aggregation capable devices at the cell site utilizing each of the remaining carrier bands. For example, the second band may be assigned to the secondary component carrier based on the second band having a traffic load that is less than the third band. In another example, the second band may be assigned to the secondary component carrier when the quantity of other inter-carrier aggregation capable devices using the second band is less than the quantity of inter-carrier aggregation capable devices using the third band. As such, SPR values are utilized, at least, for assignment of a carrier band to a primary component carrier, however additional factors may be considered in the assignment of remaining bands to secondary and/or tertiary component carriers.

Additionally or alternatively, when the quantity of inter-carrier aggregation capable devices within the coverage area of the cell site meets or exceeds a predetermined quantity, the method 800 may assign the first band to the primary component carrier associated with the at least one inter-carrier aggregation capable device based on the SPR of the first band being less than the SPR of the other available bands at the cell site. In alternative embodiments, the method 800 may assign the band of the lowest SPR antenna at the cell site to the primary component carrier of the inter-carrier aggregation devices based on whether the quantity of inter-carrier aggregation capable devices within the coverage area of the cell site meets or exceeds a predetermined quantity, independent of throughput.

Additionally or alternatively, the method may determine when a quantity of the at least one of the inter-carrier aggregation capable devices within the specified distance of the cell site meets or exceeds a predetermined quantity, assigning the first band to the primary component carrier associated with the at least one inter-carrier aggregation capable device based on the SPR of the first band being less than the SPR of the other available bands at the cell site. In alternative embodiments, the method 800 may assign the band of the lowest SPR antenna at the cell site to the primary component carrier of the inter-carrier aggregation capable devices based on whether the quantity of inter-carrier aggregation capable devices within the specified distance of the cell site meets or exceeds a predetermined quantity, independent of throughput.

In an embodiment, upon assigning the first band to a primary component carrier associated with the at least one inter-carrier aggregation capable device based on the SPR of the first band relative to the SPR of the other available bands at the cell site, the method 800 facilitates radio frequency (RF) transmissions using the first band for the primary component carrier associated with the at least one inter-carrier aggregation capable device. As such, the method concurrently facilitates RF transmissions using the second band for the secondary component carrier associated with the at least one inter-carrier aggregation capable device.

The methods 700 and 800 may be implemented via the exemplary telecommunications environment 200 of FIG. 2. In embodiments, a system operating in such an environment may perform the method 700 and 800. In embodiments, the system comprises a base station associated with a cell site having multiple antennas. The base station manages or controls communications at the cell site, for example. The cell site may be capable of facilitating RF transmissions in at least a first carrier band and second carrier band. As such, the base station may control the RF transmissions of the cell site in the first and second carrier bands. In embodiments, the base station includes memory and a processor. Via the processor, the base station monitors the cell site to identify when an inter-carrier aggregation capable device enters a coverage area of the cell site. Each time an inter-carrier aggregation capable device enters the coverage area of the cell site, the processor determines whether the inter-carrier aggregation capable device is within a predefined distance of the cell site. When the processor determines the inter-carrier aggregation capable device is within a predefined distance of the cell site, the base station proceeds with the method 800. In an embodiment, when the processor determines the inter-carrier aggregation capable device is not within a predefined distance of the cell site, the method 800 terminates or ends. Via the processor, the base station monitors throughput of the inter-carrier aggregation capable device determined to be within the predefined distance of the cell site. When throughput is at or below a threshold, the processor assigns the first carrier band, based on SPR of the band, to a primary component carrier associated with the inter-carrier aggregation capable device, wherein the SPR of the first carrier band is less than an SPR of the second carrier band. In further embodiments, the processor of the base station assigns the second carrier band to a secondary component carrier associated with the at least one inter-carrier aggregation capable device. In embodiments, the processor of the base station identifies a predetermined carrier band specific SPR value for each of the first carrier band and the second carrier band and determines, using each predetermined carrier band specific SPR value, whether the SPR of the first carrier band or the SPR of the second carrier band is less than the corresponding carrier band specific SPR values.

In accordance with the system, when the first carrier, having an SPR that is less than the SPR of the second carrier band, is to be assigned to the primary component carrier associated with the at least one inter-carrier aggregation capable device, the processor of the base station may determine a traffic load of one of the multiple antennas corresponding to the first carrier band meets or exceeds a traffic load threshold. In such an embodiment, based on the traffic load of the first carrier band, the base station may assign the second carrier band, instead of the first carrier band, to the primary component carrier, the second carrier band having the SPR that is greater than the SPR of the first band. In some embodiments, the base station assigns the first carrier band to the primary component carrier associated with the at least one inter-carrier aggregation capable device, wherein the first carrier band has the lowest SPR relative to the SPR of the second carrier band and an SPR of a third carrier band, independent of traffic load of the multiple antennas of the cell site.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method comprising:
    determining that an inter-carrier aggregation capable device is within a predefined distance of a centralized geographic location corresponding to one or more of a large-scale component or a small-scale component of a cell site, wherein the predefined distance is associated with an increased likelihood of throughput degradation;
    monitoring, by a base station associated with the cell site, throughput of the inter-carrier aggregation capable device that is within the predefined distance of the cell site;
    determining, by the base station associated with the cell site, that the throughput of the inter-carrier aggregation capable device is at or below a threshold;
    determining that a sector power ratio (SPR) of a first band is lower than an SPR of other bands at the cell site prior to assigning the first band to a primary component carrier associated with the inter-carrier aggregation capable device; and
    subsequent to determining that the throughput of the inter-carrier aggregation capable device is at or below the threshold, assigning the first band to the primary component carrier associated with the inter-carrier aggregation capable device based on the SPR of the first band.

2. The method of claim 1, further comprising assigning a second band to a secondary component carrier associated with the inter-carrier aggregation capable device, wherein the second band is associated with an SPR that is greater than the SPR associated with the first band.

3. The method of claim 2, further comprising assigning a third band to a tertiary component carrier associated with the inter-carrier aggregation capable device, wherein the third band is associated with an SPR that is greater than the SPR associated with the second band.

4. The method of claim 1, wherein the method further comprises:
    recognizing that a new inter-carrier aggregation capable device is within the predefined distance of the cell site;
    monitoring throughput of the new inter-carrier aggregation capable device;
    determining that the throughput of the new inter-carrier aggregation capable device is at or below the threshold; and
    assigning the first band to a primary component carrier associated with the new inter-carrier aggregation capable device based on the SPR of the first band.

5. The method of claim 1, the method further comprising identifying the threshold that specifies a target data rate for inter-carrier aggregation capable devices within the predefined distance of the cell site, the first band corresponding to an antenna at the cell site providing service to the inter-carrier aggregation capable device.

6. The method of claim 1, wherein monitoring the throughput of the inter-carrier aggregation capable device comprises identifying a data rate of the inter-carrier aggregation capable device.

7. One or more non-transitory computer-readable media having computer-executable instructions embodied thereon that, when executed, perform a method comprising:
    determining a quantity of inter-carrier aggregation capable devices that are within a coverage area of a cell site;

identifying at least one of the inter-carrier aggregation capable devices within the coverage area that is within a predefined distance of a centralized geographic location corresponding to one or more of a large-scale component or a small-scale component of the cell site, wherein the predefined distance is associated with an increased likelihood of throughput degradation;

analyzing, by a base station associated with the cell site, throughput of the at least one inter-carrier aggregation capable device within the predefined distance;

determining, by the base station associated with the cell site, that the throughput of the at least one inter-carrier aggregation capable device is at or below a threshold;

determining that an SPR of a first band is lower than an SPR of other available bands at the cell site prior to assigning the first band to a primary component carrier associated with the at least one inter-carrier aggregation capable device; and subsequent to determining that the throughput of the at least one inter-carrier aggregation capable device is at or below the threshold, assigning the first band to the primary component carrier associated with the at least one inter-carrier aggregation capable device based at least on determining the SPR of the first band relative to the SPR of the other available bands at the cell site.

8. The media of claim 7, further comprising assigning a second band to a secondary component carrier associated with the at least one inter-carrier aggregation capable device based on determining that the throughput of the at least one inter-carrier aggregation capable device is at or below the threshold, wherein the SPR of the first band is less than the SPR of the second band.

9. The media of claim 7, further comprising when the quantity of inter-carrier aggregation capable devices within the coverage area of the cell site meets or exceeds a predetermined quantity, assigning the first band to the primary component carrier associated with the at least one inter-carrier aggregation capable device based on the SPR of the first band being less than the SPR of the other available bands at the cell site.

10. The media of claim 7, further comprising determining when a quantity of the at least one of the inter-carrier aggregation capable devices within the predefined distance of the cell site meets or exceeds a predetermined quantity, assigning the first band to the primary component carrier associated with the at least one inter-carrier aggregation capable device based on the SPR of the first band being less than the SPR of the other available bands at the cell site.

11. The media of claim 7, wherein analyzing the throughput of the at least one inter-carrier aggregation capable device within the predefined distance of the cell site further comprises determining how many bands the at least one inter-carrier aggregation capable device is capable of utilizing.

12. The media of claim 11, further comprising identifying a threshold that is specific to how many bands the at least one inter-carrier aggregation capable device is capable of utilizing.

13. The media of claim 7, wherein upon assigning the first band to the primary component carrier associated with the at least one inter-carrier aggregation capable device based on the SPR of the first band relative to the SPR of the other available bands at the cell site, facilitating radio frequency (RF) transmissions using the first band for the primary component carrier associated with the at least one inter-carrier aggregation capable device.

14. The media of claim 13, further comprising facilitating concurrent RF transmissions using the second band for the secondary component carrier associated with the at least one inter-carrier aggregation capable device.

15. A system comprising:
a base station associated with a cell site having multiple antennas, the cell site capable of communicating RF transmissions in at least a first carrier band and a second carrier band, the base station including a processor that:
monitors the cell site to identify when an inter-carrier aggregation capable device enters a coverage area of the cell site; and
each time an inter-carrier aggregation capable device enters the coverage area of the cell site, the processor:
determines that the inter-carrier aggregation capable device is within a predefined distance of a centralized geographic location corresponding to one or more of a large-scale component or a small-scale component of the cell site, wherein the predefined distance is associated with an increased likelihood of throughput degradation;
monitors throughput of the inter-carrier aggregation capable device;
determines that an SPR of the first carrier band is lower than an SPR of a second carrier band at the cell site prior to assignment of the first carrier hand to a primary component carrier associated with the inter-carrier aggregation capable device; and
subsequent to determining the throughput is at or below a threshold, assigns the first carrier band to the primary component carrier associated with the inter-carrier aggregation capable device based on determining the SPR of the first carrier band is-being less than the SPR of the second carrier band.

16. The system of claim 15, wherein the processor of the base station:
assigns the second carrier band to a secondary component carrier associated with the inter-carrier aggregation capable device.

17. The system of claim 15, wherein the processor of the base station further:
identifies a predetermined carrier band specific SPR value for each of the first carrier hand and the second carrier hand; and
determines, using the predetermined carrier band specific SPR value for each of the first carrier band and the second carrier band, whether the SPR of the first carrier band or the SPR of the second carrier band is less than the corresponding predetermined carrier band specific SPR value.

18. The system of claim 15, wherein when the first carrier band, having the SPR that is less than the SPR of the second carrier band, is to be assigned to the primary component carrier associated with the inter-carrier aggregation capable device, the processor of the base station further:
determines that a traffic load of one of the multiple antennas corresponding to the first carrier band meets or exceeds a traffic load threshold; and
based on the traffic load of the first carrier band, assigns the second carrier band, instead of the first carrier band, to the primary component carrier, the second carrier band having the SPR that is greater than the SPR of the first carrier band.

19. The system of claim 15, wherein the processor of the base station further:

assigns the first carrier band to the primary component carrier associated with the inter-carrier aggregation capable device, wherein the first carrier band has a lowest SPR relative to the SPR of the second carrier band and an SPR of a third carrier band, independent of traffic load of the multiple antennas of the cell site.

* * * * *